US012755268B2

(12) United States Patent
Fanning et al.

(10) Patent No.: US 12,755,268 B2
(45) Date of Patent: Oct. 6, 2026

(54) SYSTEMS AND METHODS FOR AUTHENTICATION OF A USER

(71) Applicant: STRIPE, LLC, South San Francisco, CA (US)

(72) Inventors: Carolyn Fanning, Belmont, CA (US); David Yang, San Francisco, CA (US); Nicole DeBickes, Boca Raton, FL (US); Maggie White, San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 438 days.

(21) Appl. No.: 18/209,747

(22) Filed: Jun. 14, 2023

(65) Prior Publication Data

US 2024/0420112 A1 Dec. 19, 2024

(51) Int. Cl.
*G06Q 20/32* (2012.01)

(52) U.S. Cl.
CPC ................................ *G06Q 20/3278* (2013.01)

(58) Field of Classification Search
CPC ............. G06Q 20/3278; G06Q 20/352; G06Q 20/353; G06Q 20/4014; H04W 4/80
USPC ............................................................ 705/18
See application file for complete search history.

(56) References Cited

U.S. PATENT DOCUMENTS

2022/0270069 A1* 8/2022 Cat ........................ G07F 7/0893
2024/0273511 A1* 8/2024 Arora ................... G06Q 20/322

OTHER PUBLICATIONS

Francis, L et al. A Security Framework Model with Communication Protocol Translator Interface for Enhancing NFC Transactions. 2010 Sixth Advanced International Conference on Telecommunications, 2010. (Year: 2010).*

* cited by examiner

*Primary Examiner* — Fawaad Haider
(74) *Attorney, Agent, or Firm* — FINNEGAN, HENDERSON FARABOW, GARRETT & DUNNER, LLP

(57) ABSTRACT

A method and apparatus for authentication of a user is described. A system can include a memory and a processor, where the processor identifies a trigger event corresponding to an application executed by the processor of the system. Then, in response to identification of the trigger event, the processor causes an authentication process to execute on the application, including prompting the user to provide a payment instrument information via the NFC device of the system. The processor then determines if the received payment instrument information is designated as an authentication instrument for the user, in response to receipt of the payment instrument information via the NFC device of the system, determine. Additionally, in response to a determination that the received payment instrument information is designated as the authentication instrument for the user, the processor authenticates the user.

20 Claims, 6 Drawing Sheets

FIG. 6
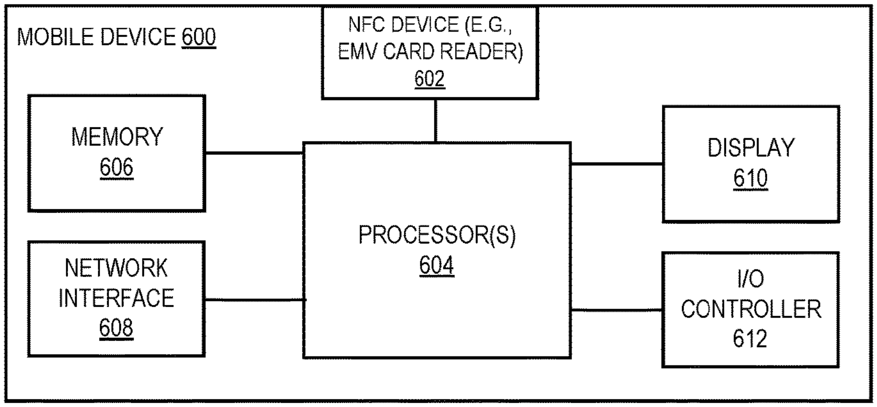
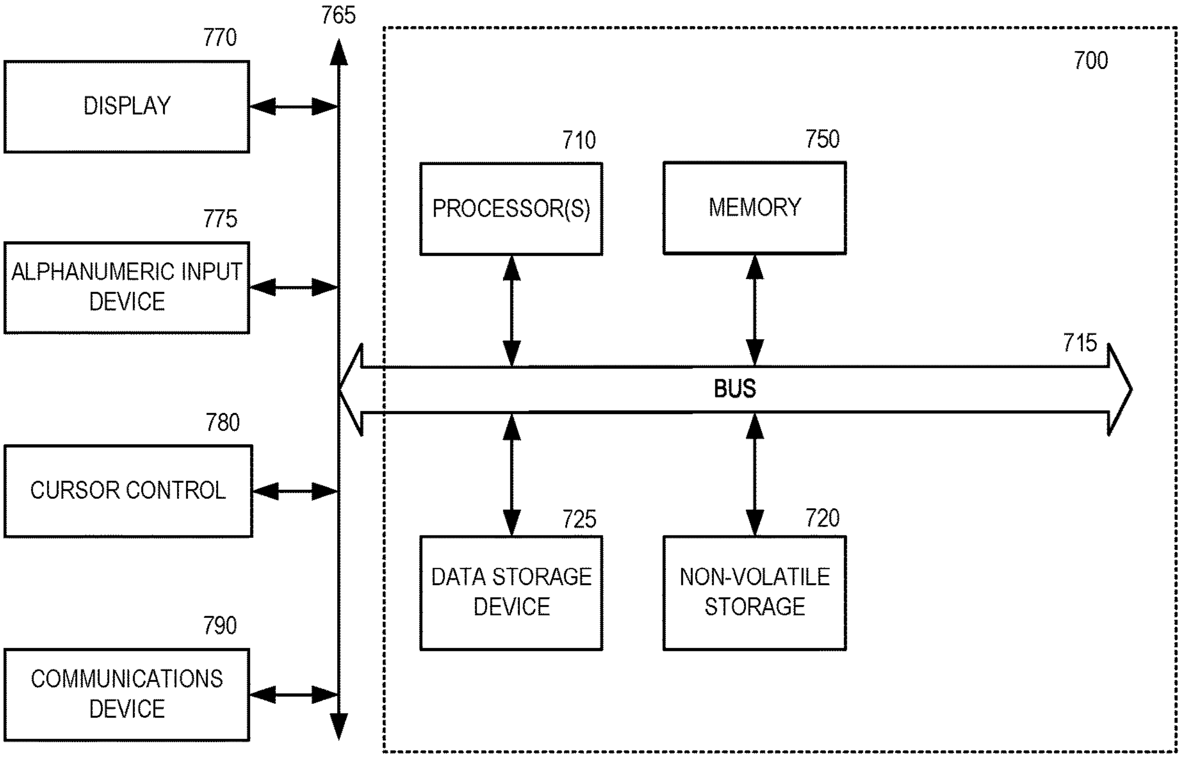
FIG. 7

SYSTEMS AND METHODS FOR AUTHENTICATION OF A USER

BACKGROUND

Merchants, such as grocers, car services, dry cleaning services, etc., provide their products and services to customers for a fee. To collect fees for products or services provided, a merchant will typically enter an amount to be collected in a point of sale (POS) device, the POS device will communicate this data to a reader, and the card will collect payment data, such as Europay, Mastercard, Visa, etc. data collected from a credit, debit, gift card, electronic benefits, or other payment instrument provided by the customer. In some systems, the payment data may be collected via a contactless reader, where payment data is exchanged with a mobile device, an EMV chip, smart card, or other payment instrument that exchanges near field communications with a contactless reader. That payment data is then used by the POS device and/or the card reader to authorize the transaction, for example by a commerce platform system, and ultimately approve and charge the fee for the merchant with banks and/or card providers.

In order to authenticate the customer before processing and authorizing the payment for the transaction, a human user may be required to confirm a name on the payment instrument, enter a personal identification number may be required from the customer, as well as other forms of user identity authentication. However, these forms of authenticating the identity of the customer as the rightful user of the payment instrument are often insufficient to prevent fraudulent transactions. For example, human operators may fail to perform sufficient identity verification procedures, or a personal identification number may be stolen, guessed, or not required as a part of a transaction.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 6 is one embodiment of a device having a contactless reader that may be used to support the systems and operations discussed herein.

FIG. 7 is one embodiment of a computer system that may be used to support the systems and operations discussed herein.

DETAILED DESCRIPTION

Figure 1:
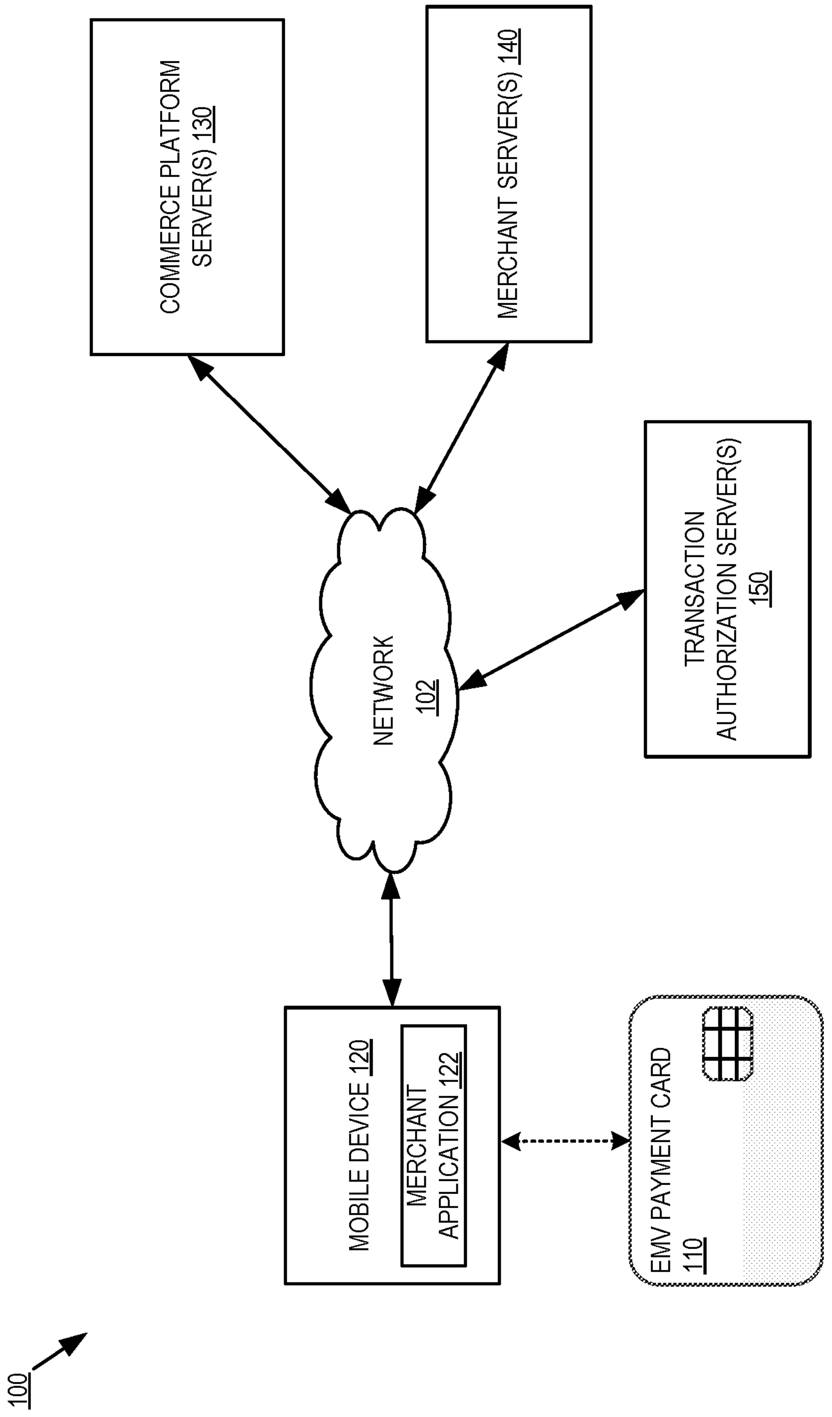
FIG. 1 is a block diagram of an exemplary system architecture for authenticating a user with payment instrument data collected using near field communications capabilities of a device.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "causing", "determining", "authenticating", "detecting", "initiating", "receiving", "transmitting", "generating", "using", "collecting", "accessing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for authenticating a user with payment instrument data collected using near field communications capabilities of a device. In one embodiment, the system includes a mobile device 120, one or more commerce platform server(s) 130, one or more merchant server(s) 140, and one or more transaction authorization server(s) 150.

In one embodiment, mobile device 120 may be a user device, such as a smartphone, tablet computer, laptop computer, or other hardware device having a near field communications (NFC) device, where the user is participating in a transaction with a merchant associated with merchant server(s) 140. In another embodiment, mobile device 120 may be a merchant device, such as a tablet computer, laptop computer, or kiosk device also having NFC device, enabling the user to participate in a transaction with the merchant. An embodiment of a mobile device is illustrated in FIG. 6 and discussed below. Furthermore, commerce platform server(s) 130 and third party certification system 140 are also computing devices, such as server computers, desktop computers, distributed service systems, etc. that include typical computing hardware, as illustrated and as discussed below for FIG. 7.

The mobile device 120, commerce platform server(s) 130, merchant serve(s) 140, and transaction authorization server(s) 150 may be coupled to a network 102 and communicate with one another using any of the standard protocols for the exchange of information. In one embodiment, one or more of the mobile device 120, commerce platform server(s) 130, merchant serve(s) 140, and transaction authorization server(s) 150 may run on one Local Area Network (LAN) and may be incorporated into the same physical or logical system, or different physical or logical systems. Alternatively, one or more of the mobile device 120, commerce platform server(s) 130, merchant serve(s) 140, and transaction authorization server(s) 150 may reside on different LANs, wide area networks, cellular telephone networks, etc. that may be coupled together via the Internet but separated by firewalls, routers, and/or other network devices. In one embodiment, commerce platform server(s) 130 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc. Furthermore, in embodiments, mobile device 120, commerce platform server(s) 130, merchant serve(s) 140, and transaction authorization server(s) 150 may communicate with one another via network 102 using various protocols for the exchange of information, such as secure protocols including TLS, SSL, SSH, etc.

In one embodiment, commerce platform system 130 provides financial processing services to one or more merchants, such as to merchant server(s) 140. For example, commerce platform system(s) 130 may manage merchant accounts held at the commerce platform, run financial transactions initiated by merchant application 122 performed on behalf of a merchant, clear transactions with third party systems such as transaction authorization server(s) 150 (e.g., banking servers, credit card servers, etc.), performing payouts to merchant and/or agents of the merchant, manage merchant and/or merchant user accounts held at the commerce platform server(s) 130, as well as other services typically associated with commerce platforms systems such as, for example, STRIPE™.

In an embodiments, because transactions involve sensitive information collection and/or distribution of funds to various parties to a transaction, ensuring that the authenticity of the parties to the transaction becomes very important. Furthermore, in remote transaction processing environments, such as where systems are separated from one another over a network (e.g., network 102), user verification that ensures a user is who they say they are, is associated with a form of payment being used in the transaction, is not performing a fraudulent transaction, etc. is an ever increasingly important technical challenge to be addressed.

In embodiments, as will be discussed in greater detail below, the mobile device 120 executes merchant application 122 for capturing one or more elements of payment instrument data from EMV payment card 110, or other contactless payment instruments and/or devices (e.g., a second mobile device, smart watch, etc. having payment instrument data stored thereon). In embodiments, mobile device 120 uses an NFC device to capture the one or more elements of payment instrument data for authenticating the user during a transaction and/or enrolling a user to a service of the merchant, based on the captured one or more elements of payment instrument data. This capture of payment instrument data is not for the purpose of completing payment for the underlying transaction or service enrollment (e.g., the payment instrument data is not collected to satisfy a payment), but instead is captured for authentication of a user and/or the user's purported identity. Thus, in embodiments, payment instrument 110 may be different from a second payment instrument supplied to provide payment for a transaction and/or billing for an enrolled service, and such the second payment instrument is captured at a later time during the transaction and/or service enrollment. However, in embodiments, the second payment instrument is payment instrument 110, and payment data is captured from payment instrument 110 after the authentication/enrollment processes discussed herein, and at an appropriate time during the transaction process. In yet other embodiments, the payment instrument used for completion of the financial aspects of the transaction may be stored by the merchant application 122, commerce platform server(s) 130, and/or merchant server(s) 140 for enabling card-not-present transactions.

In embodiments, merchant application 122 is an application distributed by merchant server(s) 140 that integrates functions of a software development kit (SDK) of the commerce platform server(s) 130, where the SDK of the commerce platform server(s) 130 exposes payment processing functions for use by the mobile device 120 including capturing payment instrument data using NFC capabilities of the mobile device. Furthermore, prior to capture of such payment instrument data whether for authentication and/or transaction payment, in some embodiments, SDK of the merchant application 122 establishes trust in the environment in which the application is installed and executed on the mobile device 120 by performing an attestation the device has not been tampered with (e.g., verification of an operating system, verification of freedom from boot loader tampering, etc.), the mobile application 122 is the application seeking to perform a transaction (e.g., verification of an identity of an application associated with one or more encryption keys), and the SDK has not been tampered with, and thus the transaction process, user enrollment to the server, as well as other functions performed by the merchant application 122 are trustable by utilizing the attestation processes, as discussed in U.S. patent application Ser. No. 17/976,432, entitled “Systems and Methods for Terminal Device Attestation for Contactless Payments”, which is incorporated by reference in its entirety. An embodiment of the mobile device 120 is illustrated and discussed below in FIG. 6. In embodiments, merchant application 122, integrated with the SDKs distributed by the commerce platform server(s) 130 therefore enables a user of mobile device 120 to perform a transaction including securely authenticating an the user performing the transaction is who they say they are, and that the merchant application 122 is free from tampering. Thus, the merchant application secures both the transaction environment and authenticates the identity of the user performing the transaction with mobile device 120.

In embodiments, merchant application 122 receives a request from the user of mobile device 120 to perform a transaction. However, in order to authenticate the user before collecting payment information from the transaction, the user is first authenticated as being the actual user who has requested the transaction. Typically, such a user authentication would involve a user supplying login information to the merchant application 122, supplying a secret personal identification number (PIN), or other secret information. However, such information is sometimes compromised, guessable, or otherwise available to nefarious actors. Therefore, in embodiments, SDKs of the merchant application 122 initiates a request to capture payment instrument data known to be associated with the user seeking to perform the transaction, for example by identifying a specific payment instrument from which data is to be supplied. In embodiments, this known payment instrument data may be stored by merchant application 122 (e.g., in encrypted form or otherwise secured), stored by commerce platform server(s) 130, or stored by merchant server(s) 140. Furthermore, the stored payment instrument data may be payment instrument data collected from a payment instrument used in a prior user-authorized transaction, payment instrument data collected prior to the transaction for the purpose of user authentication, or other known payment instrument data. In embodiments, the known payment instrument data is then compared to the captured payment instrument data, may be any data stored by the contactless payment instrument, such as one or more account numbers, one or more certificates, cardholder information such as name, expiration date, etc.

In embodiments, when EMV payment card 110 is in range of an NFC device of the mobile device 120, the NFC device captures payment instrument data purported to be associated with the user performing the transaction. The capturing includes establishing a NFC connection between the NFC device of the mobile device 120 and the payment instrument 110 (e.g., performing a security handshake, exchanging initiation data, exchange keys, establishing communications protocols, etc.). In some embodiments, where the known payment instrument data is securely stored by the merchant application 122, then the merchant application may compare the captured information with the known payment instrument data. However, in embodiments, where the known payment instrument is remote to the mobile application 122, mobile application transmits the captured payment instrument to the commerce platform server(s) 130 or merchant server(s) 140, using secure protocols for the exchange of information. The receiving server(s) then perform the comparison of the captured payment instrument data with the known/stored payment instrument data, and returns a match result to the merchant application 122. In either embodiment, when there is a match, then the user is authenticated as the actual user seeking to perform the current transaction. When there is not a match, then the transaction may be rejected and/or a second user authentication perform.

Therefore, in embodiments, payment instrument data is collected by the merchant application 122 using NFC capabilities to authenticate a user. The payment instrument data collected for the purpose of user authentication is not necessarily that used for providing payment for the transaction, and the data used to satisfy payment may be supplied at a different stage of the transaction (e.g., a user authentication stage may collect a first payment instrument data, and a payment stage may collect a second payment instrument data). Thus, as discussed herein, the payment instrument data is transformed into user authentication data during this authentication process. Typically, payment cards are physically possessed by a user, and are considered valid/secure unless reported as stolen by the user of that payment instrument. Thus, the collection and use of such payment instrument data from a currently valid card is a way of ensuring that the user seeking to perform a transaction physically possesses a specific card, the card is associated with the user, and the card data is known to be associated with the user, thereby providing a strong user authentication.

Furthermore, in embodiments, mobile application 122 may require a user to log into the application before seeking to perform a transaction, such as providing a username and password, PIN, etc. Thus, the strong user authentication performed using payment instrument data during a transaction forms a secure second authentication factor, which in embodiments may be used for application login purposes, to further ensure authenticity of a user seeking access to an application and later during a transaction.

In embodiments, merchant application 122 leverages the authentication based on collected payment instrument data as part of a transaction process. That is, the payment instrument data collection and verification forming a user authentication may be performed by mobile application 122 as part of every transaction performed by the mobile application 122. However, in some embodiments, the mobile application 122 may be triggered to collect the payment instrument data, as a second authentication factor, in response to detecting one or more trigger events during an ongoing transaction. In this embodiment, mobile application 122, commerce platform server(s) 130, and/or merchant server(s) 140 may analyze one or more factors of a current transaction, such as amount (e.g., exceeds a threshold, exceeds an upper range of a typical transaction for the user, etc.), location (e.g., is in a location not associated with the user, a significant location change is detected such as sequential transactions occurring in different geographic regions, etc.), a type of transaction (e.g., a transaction requesting an account change, such as a beneficiary change, a request to add money to an account, a change of personal information in an account, etc.), or other conditions that benefit from a strong user authentication or second user authentication before proceeding. Thus, the detection of one or more of these trigger events during a transaction may cause the mobile application 122 to perform the user authentication by collection of payment instrument data, as discussed herein, to provide a strong authentication before a transaction having one or more of these trigger events is allowed to proceed.

In embodiments, the payment instrument used for user authentication may or may not be the payment instrument used for completing a transaction. In either embodiment, a user may seek to enroll a specific payment instrument, such as EMV card 110, another payment instrument, etc., as the payment instrument to be used for authentication. In this embodiment, mobile application 122, similar to the above, prompts a user for collection of payment instrument data (e.g., to be enrolled for user authentication), activates an NFC device of mobile device 120, and collects payment instrument data. In this embodiment, the payment instrument data may then be encrypted and stored locally by the mobile application 120, or transmitted to commerce platform server(s) 130 and/or merchant server(s) 140 for storage. In either embodiment, a user may select to enroll a specific payment instrument for user identity verification, as discussed herein.

Figure 2:
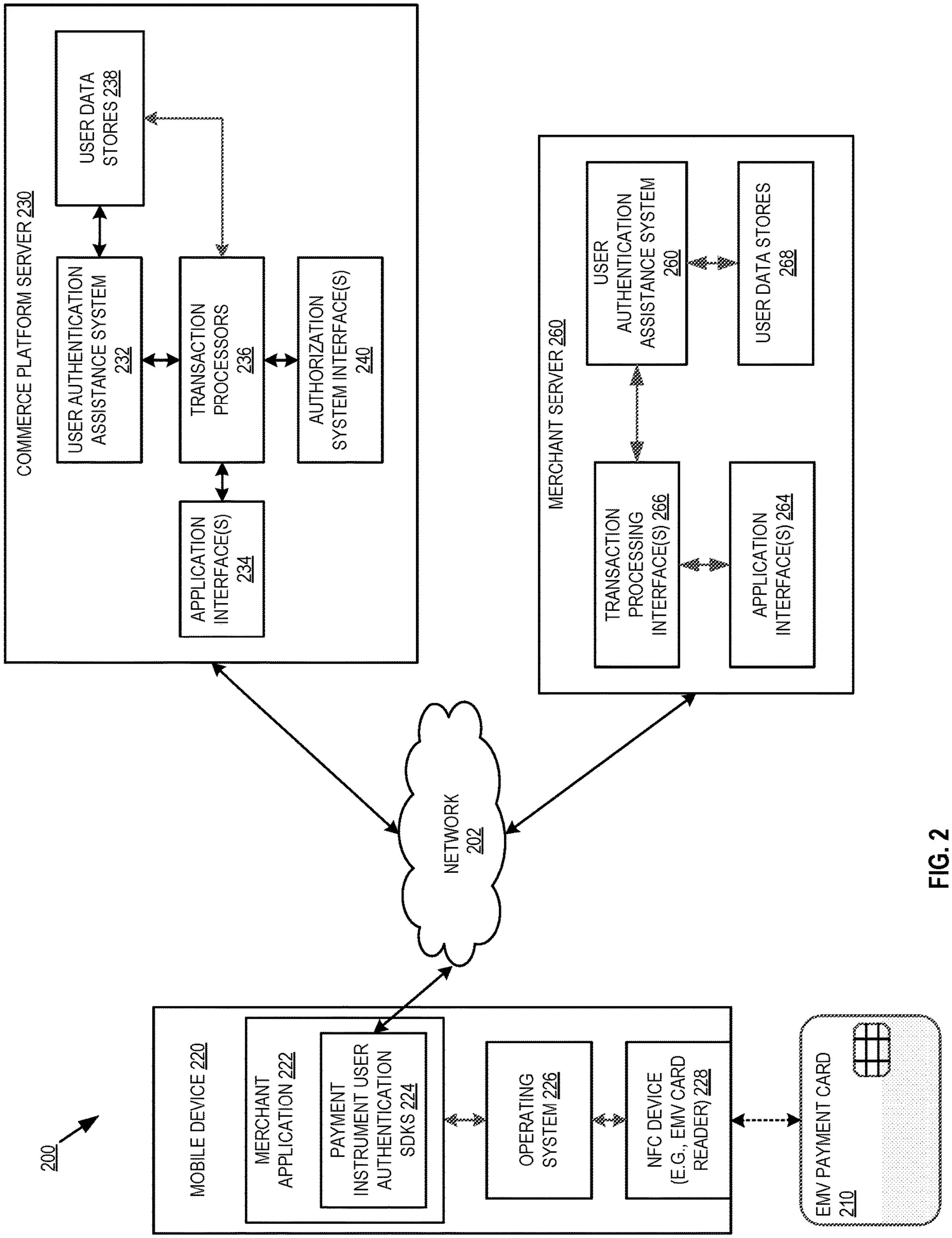
FIG. 2 is a block diagram of one embodiment of commerce platform server(s) that enable authentication of a user with payment instrument data collected using near field communications capabilities of a device.

FIG. 2 is a block diagram of one embodiment of commerce platform server 230, a mobile device 220, and a merchant server 260 that enable authentication of a user with payment instrument data collected using near field communications capabilities of the mobile device 220. The commerce platform server 230, merchant server 260, and mobile device 220 provide additional details of the commerce platform server(s) 130, merchant server(s) 140, and mobile device 120 discussed above in FIG. 1.

In embodiments, mobile device 220 is a consumer off-the-shelf hardware device, such as a smartphone, tablet computer, or other device having wireless communications capabilities (e.g., NFC device 228) for collecting payments instrument data, as well as network communications capabilities for interacting with commerce platform server 230 and/or merchant server(s) 260, as discussed herein. The mobile device 220 has additional hardware components, such as one or more processors, memory, a bus, communications interface, and other hardware components associated with such terminal device(s).

The mobile device 220, in embodiments includes an operating system 226, such as the ANDROID™, IOS™, or other operating system. The operating system 226 may include functions for interacting with the merchant application 222 and NFC device 228. The merchant application 222 is executed by the operating system 226, and includes payment instrument user authentication SDKs 224. These SDKs 224 are distributed by the commerce platform server 230 and integrated into the merchant application before distribution by the merchant server 240. In embodiments, the SDKs 224 utilize functions of the operating system 226 to verify integrity of the device 220, access the NFC device 228, access communications functions of the mobile device 220, and collect, encrypt, and communicate payment instrument data as discussed herein.

Commerce platform server 230 includes a plurality of systems, such as the application interface(s) 234, user authentication assistance system 232, transaction processors 236, authorization system interface(s) 240, and user data store(s) 238. Merchant server 240 also includes a plurality of systems, such as the application interface(s) 264, transaction processing interface(s) 266, user authentication assistance system 260, and user data store(s) 268. These systems, as discussed herein, assist in enrollment of payment instrument data for user authentication, and capture and verification of payment instrument data for user authentication, such as during a transaction performed by merchant application 222.

Merchant application 222 renders a display of an application to a user of mobile device 220. The merchant application 222, in embodiments, is a transaction processing application in which a good or service of the merchant is provided to the user of mobile device 220, and which payment is collected and processed by the commerce platform server 230 on behalf of the merchant server 260.

In some embodiments, prior to processing a transaction using the application 222, merchant application 222 provides a user interface for enrolling a payment instrument for user authentication during later transactions. The enrollment of the payment instrument may be part of an initial enrollment of a user to the merchant application 222, or a subsequent second factor authentication enrollment (e.g., a user has initial authentication credentials, such as a username, password, PIN, etc. for accessing the goods or services of the merchant via the application 222). To enroll a payment instrument for user authentication, merchant application 222 uses one or more functions of SDKs 224 to activate the NFC device 228, prompt a user to supply a payment card within a reading proximity of the NFC device 228, and captures one or more elements of payment instrument data (e.g., user information, card information, certificates, etc.). Furthermore, the SDKs may then encrypt the captured payment information using one or more keys of the SDKs 224 or merchant application 222 (e.g., keys provided by user authentication assistance system 232), or operating system 226 (e.g., OS keys maintained in a secure computing environment of the operating system 226, or mobile device 220 accessible via the operating system 226). The encrypted payment instrument data may then be stored, locally by merchant application 222 and/or transmitted for remote storage in one or more of user data store 238 and 268.

In embodiments, however, payment instrument data need not be enrolled via a specific enrollment process. In this embodiment, a prior transaction in which no fraud was detected, a user did not report the transaction as fraudulent, or having other guarantees of authenticity, payment instrument data used in that prior transaction can be considered to be valid and stored by one or more of the merchant application 220, commerce platform server 230, and merchant server 260 as discussed above. This payment instrument data can be considered as known payment instrument data, and then later used for user authentication purposes as discussed herein.

When merchant application 222 is requested to perform a transaction by a user of mobile device 220, merchant application 222 may initiate the transaction using the SDKs 224. In embodiments, this can include communicating transaction parameters to one or more of application interface(s) 234 of commerce platform server 230 and/or application interface(s) 264 of merchant server 260. The initiation of the transaction may communicate initial transaction parameters, such as amount of transaction, metadata associated with the transaction (e.g., location data captured by the mobile device), type of transaction (e.g., requested purchase of a good or service of the merchant, request to change an account setting, add monetary value to a balance of an account, etc.), as well as other initial transaction related information.

In one embodiment, one or more of merchant application 222, SDKs 224, transaction processors 236 of commerce platform server 230, or transaction processing interface(s) 266 of merchant server 260 may detect a trigger event that initiates a user authentication process. The authentication process, in embodiments, is initiated in response to the trigger condition to improve the security associated with the underlying user transaction. As discussed herein, for example, certain factors may be associated with fraud and/or implicate the expose/use of sensitive user information. To efficiently protect and safeguard the user's personal information, transaction information, etc., the authentication process is triggered to verify an identity of a user before exposure and/or use of such sensitive information. Furthermore, the trigger conditions, and following authentication processes discussed herein, address the challenges of perform the subsequent authentication in modern computing environments, such as between remote systems, where payment cards may or may not be present, associated with mobile device applications, etc. For example, a transaction having a value over a predefined amount, a transaction having a value outside of a typical range of transaction amount associated with a user, a transaction occurring in a specific untrusted geographic location, a transaction having a parameter significantly different from a prior transaction (e.g., a prior transaction occurred in Los Angeles, USA and a subsequent transaction occurred in London, England), a transaction that seeks to access or change sensitive user account information (e.g., change a user name, change a beneficiary, change contact information, etc.). In response to detecting such a trigger event, payment instrument based user authentication is initiated by the SDKs 224 as a form of second factor authentication of a user's identity.

In another embodiment, payment instrument data based user authentication is initiated for each transaction where the merchant application 222 is configured to perform two factor authentication for each transaction to be processed.

Similar to enrollment above, when a payment instrument data based user authentication is triggered (e.g., either by a detected condition, or as part of a transaction processing flow), SDKs 224 activate the NFC device 228, prompt a user to supply a payment instrument within a reading proximity of the NFC device 228, and capture one or more elements of payment instrument data (e.g., user information, card information, certificates, etc.). In embodiments, the prompt for the payment instrument may specify a specific payment instrument, such as a previously enrolled payment instrument, a payment instrument associated with the last four digits of a card number (e.g., card ending in "1234"), a payment instrument from a specific financial institution (e.g., a card from a specific card provider), a payment instrument used in a specific prior transaction (e.g., a card used at Store on Monday), etc. The NFC device 228 then captures payment instrument data from card 210. Furthermore, the SDKs may then encrypt the captured payment instrument data. The encrypted payment instrument data may then be stored, locally by merchant application 222 and/or transmitted for remote storage in one or more of user data store 238 and 268.

When stored locally, the SDKs 224 may decrypt the stored data, decrypt locally stored known payment card data, and compare the captured data purported to be associated with a user against the payment instrument data known to be associated with the user. If a match is made, the transaction may be enabled to proceed. That is, the transaction may then request a payment instrument be provided (for a card present transaction), a user select a stored payment instrument (for a card not present transaction), and the payment information transmitted to commerce platform server 230. Commerce platform server 260 then uses the received payment instrument to clear the transaction with one or more authorization systems via authorization system interface(s) 240, store transaction data in user data store(s) 238, and notify merchant server 260 via interface(s) 266 and/or merchant application 222 when a transaction has been completed.

When stored remotely, the SDKs transmit encrypted payment instrument data to one or more of commerce platform server 230 and/or merchant server 260. Like above, the encrypted payment instrument data may be decrypted by commerce platform server 230 and/or merchant server 260 and compared against known payment instrument data of a user as stored in respective data store(s) 238 and/or 268. Based on a comparison result, a user is either authenticated or not, and the result returned to merchant application via interface(s) 234 and/or 264. Merchant application receives the results of the verification, and when negative, rejects the transaction. However, when a positive user authentication is received, the transaction may be enabled to proceed as discussed above.

Therefore, in the embodiments discussed above, user payment instrument data may be collected prior to a transaction for the purpose of later verifying an identity of a user during a transaction. Furthermore, this pre-collected payment instrument data may then later be used, or other payment instrument data known to be associated with user, to verify an identity of a user during a transaction. As discussed herein, the payment instrument data is captured via an NFC device and is therefore associated with physical possession of the payment instrument. Furthermore, a payment instrument in good standing (e.g., not reported as lost/stolen, not expired, etc.) is assumed to only be in possession of the rightful owner. Thus, the collection and verification of such payment instrument data forms a strong user authentication during a transaction to efficiently and effectively authenticate the user to address the challenges discussed above.

Figure 3:
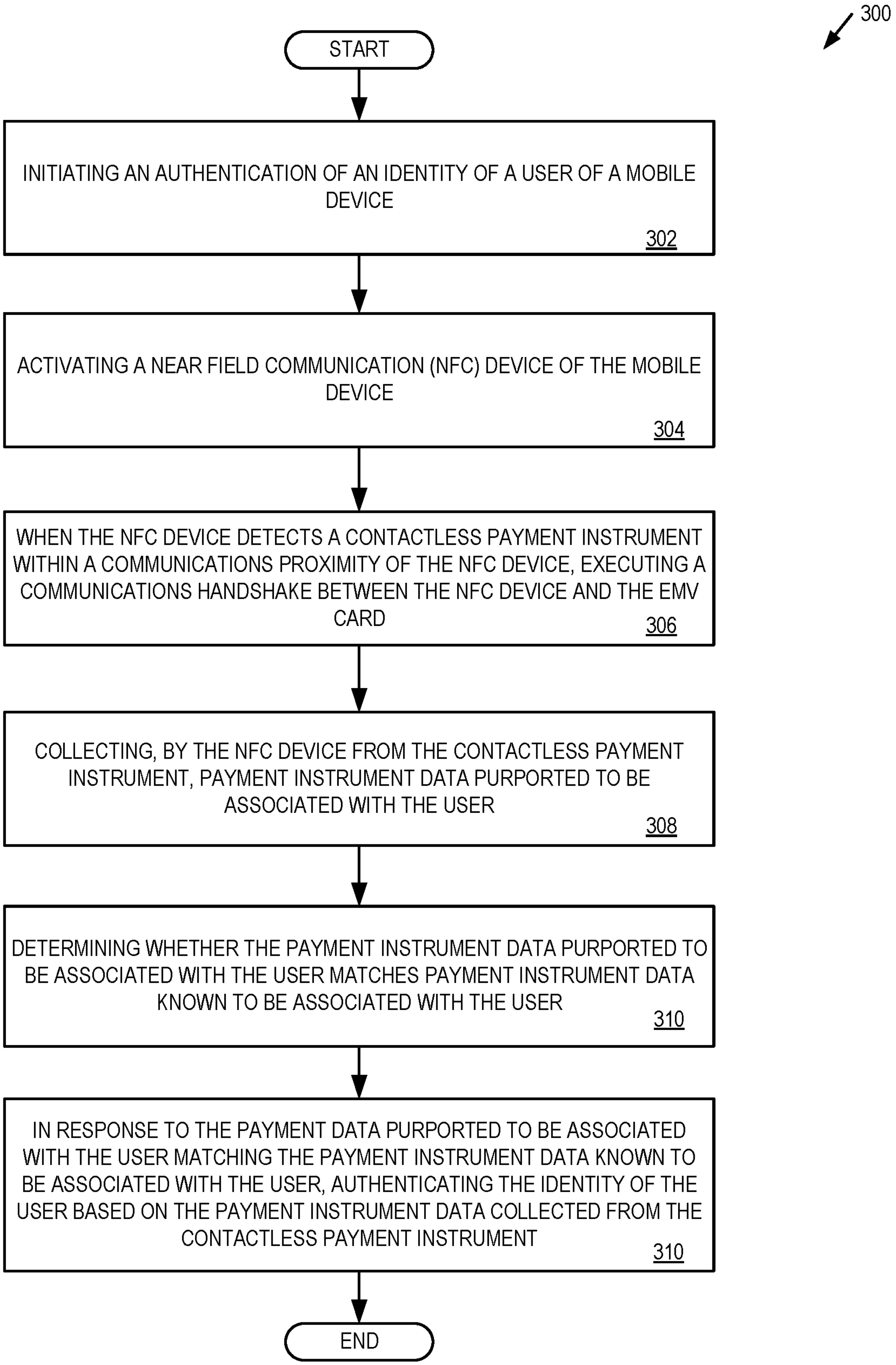
FIG. 3 illustrates one embodiment of a process for performing user authentication with payment instrument data collected using near field communications capabilities of a device.

FIG. 3 illustrates one embodiment of a process 300 for performing user authentication with payment instrument data collected using near field communications capabilities of a device. The process 300 is performed by processing logic that may comprise hardware (circuitry, dedicated logic, etc.), software (such as is run on a general-purpose computer system or a dedicated machine), firmware, or a combination thereof. In one embodiment, the process 300 is performed by one or more of a mobile device, commerce platform server(s), and merchant server(s) (e.g., commerce platform server(s) 130 or 230, mobile device 120 or 220, and merchant server(s) 140 or 260).

Referring to FIG. 3, processing logic begins by initiating an authentication of an identity of a user of a mobile device (processing logic 302). In embodiments, the authentication process is initiated by the mobile device executing a merchant application. As discussed herein, the mobile device, in embodiments, may be the user's mobile device (e.g., mobile phone, tablet, etc.), or a mobile device of a merchant (e.g., a tablet based kiosk, a point of sale device, etc.). In either embodiment, the mobile device executes a merchant application that provides access to good and/or services of the merchant. Furthermore, the merchant application for which authentication is being performed is integrated with an SDK of a commerce platform system. In embodiments, the authentication is part of a user identity authentication process triggered or initiated by the merchant application.

Processing logic activates a near field communication (NFC) device of the mobile device (processing block 304). In embodiments, one or more functionalities of the commerce platform integrated into the merchant application are responsible for activating the NFC device. When the NFC device detects a contactless payment instrument, such as an EMV card, within a communications proximity of the NFC device, processing logic executes a communications handshake between the NFC device and the EMV card (processing block 306). The communications handshake may include exchanging data, negotiating a connection, exchanging keys for encrypting communications, as well as exchanging and negotiating other parameters to establish and secure a wireless communication link between a payment instrument and the NFC device.

Processing logic then collect, by the NFC device from the contactless payment instrument, payment instrument data purported to be associated with the user (processing block 308). The payment instrument data may be any combination of one or more payment instrument data collectable from the payment instrument. For example, processing logic may collect one or more of user information, card data, certificates, application identifiers, etc. as a set of payment instrument data purported to be associated with the user performing the transaction.

Processing logic determines whether the payment instrument data purported to be associated with the user matches payment instrument data known to be associated with the user (processing block 310). In embodiments, the payment instrument data known to be associated with the user may be enrolled payment instrument data, payment instrument data captured in a prior transaction, or a combination thereof, as discussed herein.

In response to the payment instrument data purported to be associated with the user matching the payment instrument data known to be associated with the user, processing logic authenticates the identity of the user based on the card data collected from the contactless payment instrument (processing block 310). Thus, the user is authenticated and the transaction the user is seeking to perform is enabled to proceed to a later payment stage, one or more stages defining characteristics of the transaction, etc.

Figure 4:
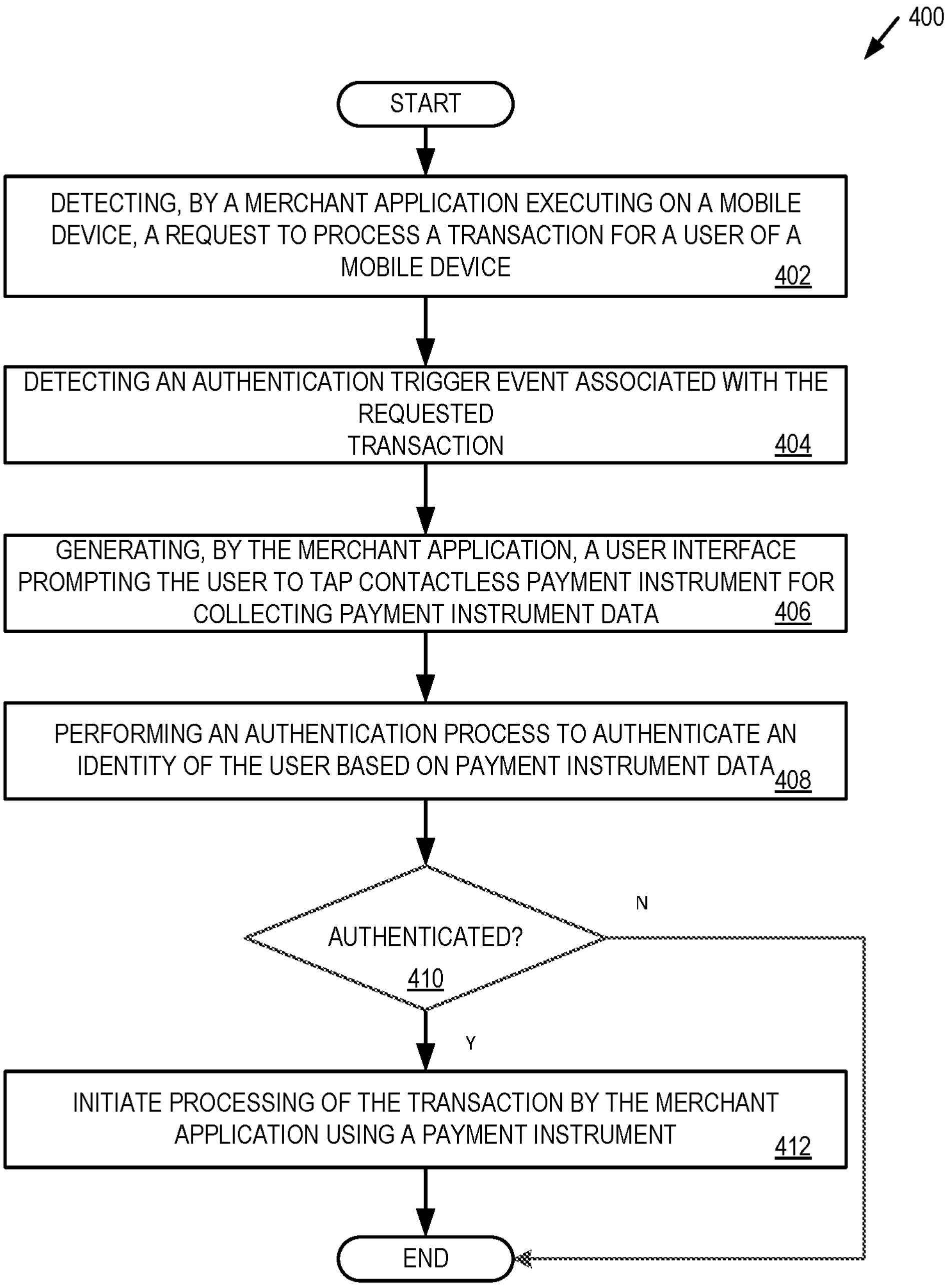
FIG. 4 illustrates one embodiment of a process for performing user authentication of a user during a transaction with payment instrument data collected using near field communications capabilities of a device.

FIG. 4 illustrates one embodiment of a process 400 for performing user authentication of a user during a transaction with payment instrument data collected using near field communications capabilities of a device. The process 400 is performed by processing logic that may comprise hardware (circuitry, dedicated logic, etc.), software (such as is run on a general-purpose computer system or a dedicated machine), firmware, or a combination thereof. In one embodiment, the process 400 is performed by one or more of a mobile device, commerce platform server(s), and merchant server(s) (e.g., commerce platform server(s) 130 or 230, mobile device 120 or 220, and merchant server(s) 140 or 260).

Referring to FIG. 4, processing logic begins by detecting, by a merchant application executing on a mobile device, a request to process a transaction for a user of a mobile device (processing block 402). In embodiments, the transaction is a transaction to purchase goods or services of the merchant via the merchant application.

Processing logic then detects an authentication trigger event associated with the requested transaction (processing block 404). In embodiments, the trigger event may be a log-in detected by a merchant application during the transaction, a risk detected by the merchant application, a commerce platform system, or a merchant system for the transaction (e.g., transaction amount over a threshold, a location change, etc.), detection of a type of transaction by the merchant application in application, commerce platform system, or merchant system (e.g., an account top up adding value to an account, a beneficiary change impacting account data within the application or user data stores of the commerce platform system or merchant, etc.), detecting a user request to log into the mobile application (e.g., where payment instrument data forms login credentials, as discussed below). Many events may be detected as trigger events consistent with the discussion herein.

Processing logic generates, by the merchant application, a user interface prompting the user to tap a contactless payment instrument for collecting payment instrument data (processing block 406). The user interface may indicate a location at which to tap the payment instrument, when to tap the payment instrument, etc. Furthermore, the prompt may include data that partially identifies the payment instrument from which user authentication is to be performed (e.g., a partial card number of an EMV card, a type of card, a card associated with a prior transaction, etc.).

Processing logic then performs an authentication process to authenticate an identity of the user based on payment instrument data (processing block 408). In embodiments, the authentication process is that discussed above in FIG. 3, as well as elsewhere herein. Processing logic then determines whether the user has been successfully authenticated (processing block 410

When the user is not authenticated, the process ends and a negative authentication result is returned to a user. Alternatively, and not shown, the process may return to processing block 406 in an attempt to obtain a positive user authentication using the process of FIG. 3. This may be reperformed a predetermined number of times before a negative authentication result is returned and the process ends.

However, when the user is authenticated based on the captured payment instrument data, processing logic initiates processing of the transaction by the merchant application using a payment instrument (processing block 412). That is, the merchant application may then proceed with the purchase of the good or service, topping up a balance of an account, etc. As discussed herein, such actions would then use a card for that stage of the transaction. This may be the same contactless payment card, in which case the payment instrument data would be collected for payment purposes during this transaction stage. The card may also be a different contactless payment card or card-not-present data. In either embodiment, after user authentication the requested transaction is processed to completion.

Figure 5:
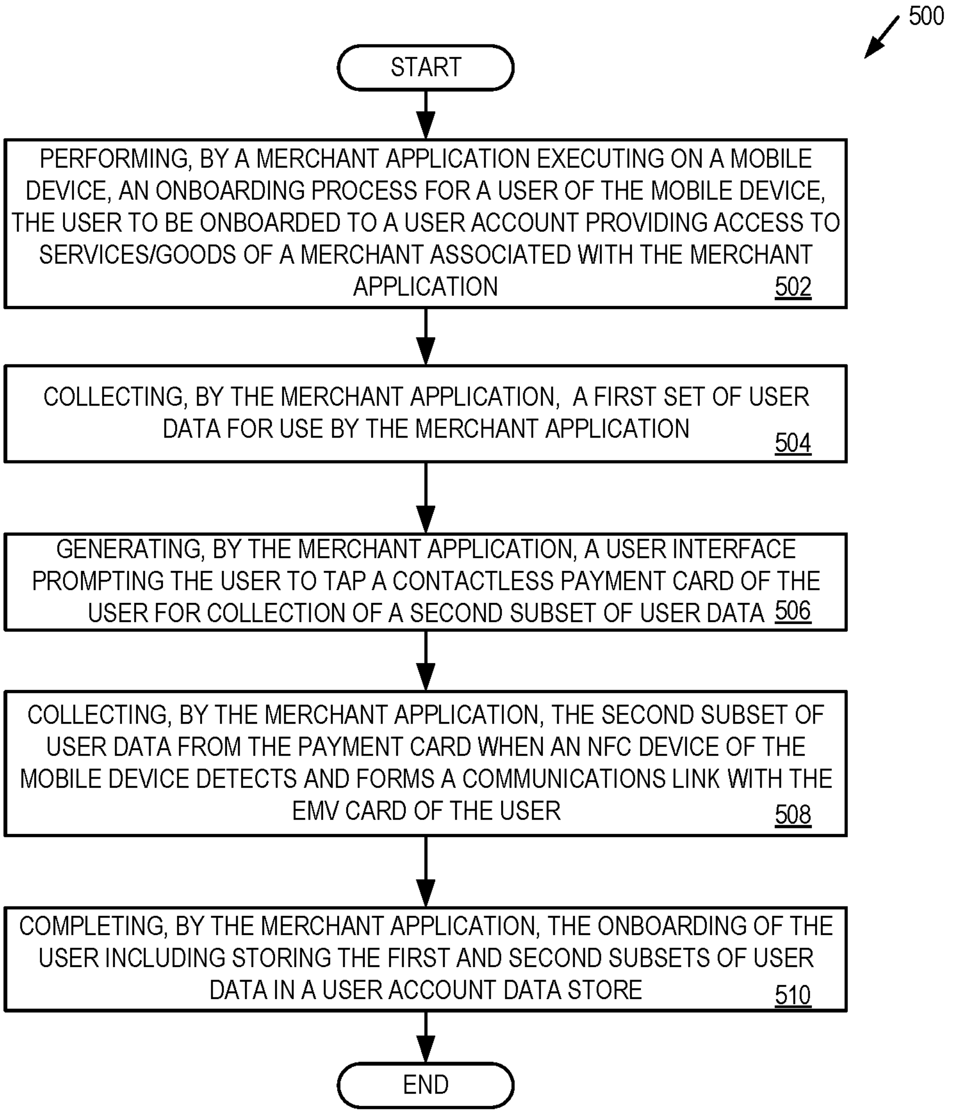
FIG. 5 illustrates one embodiment of a process for performing an onboarding process that collects user information from payment instrument data collected using near field communications capabilities of a device.

FIG. 5 illustrates one embodiment of a process 500 for performing an onboarding process that collects user information from payment instrument data collected using near field communications capabilities of a device. The process 500 is performed by processing logic that may comprise hardware (circuitry, dedicated logic, etc.), software (such as is run on a general-purpose computer system or a dedicated machine), firmware, or a combination thereof. In one embodiment, the process 500 is performed one or more of a mobile device, commerce platform server(s), and merchant server(s) (e.g., commerce platform server(s) 130 or 230, mobile device 120 or 220, and merchant server(s) 140 or 260).

Referring to FIG. 5, processing logic begins by performing, by a merchant application executing on a mobile device, an onboarding process for a user of the mobile device, the user to be onboarded to a user account providing access to services/goods of a merchant associated with the merchant application (processing block 502). The onboarding process may include an onboarding to the application as well as an onboarding to payment instrument data based user authentication.

Processing logic collects, by the merchant application, a first set of user data for use by the merchant application (processing block 504). The first set of user data can include account data, such as name, address, email, phone number, etc. Furthermore, the first set of account data can include initial user authentication data, such as an account username, account password, a personal identification number, answers to authentication questions, etc.

Processing logic then generates, by the merchant application, a user interface prompting the user to tap a contactless payment card of the user for collection of a second subset of user data (processing block 506). In embodiments, the prompt to tap the contactless payment instrument is for a contactless payment instrument (e.g., EMV card, mobile payment device, etc.) to be used for later user authentication purposes. In some embodiments, payment instrument data collected by processing logic may be used as login credentials to the application. When payment instrument data is used as login credentials, the payment instrument data collected and captured as discussed above may replace user entry of any information (e.g., user name and password), may replace a user's typed password, may forma second authentication factor for login, etc.

Processing logic then collects, by the merchant application, the second subset of user data from the payment card when an NFC device of the mobile device detects and forms a communications link with the EMV card of the user (processing block 508). In embodiments, processing logic utilizes the techniques discussed herein for establishing a wireless connection and collecting data from a payment instrument using an NFC device. Processing logic then completes, by the merchant application, the onboarding of the user including storing the first and second subsets of user data in a user account data store (processing block 510). The user data store, as discussed herein may be local to a user's device, such as security stored in encrypted form by a mobile application. In some embodiments, the user data store may be a remote data store, such a commerce platform and/or merchant data store. In this embodiment, encrypted payment instrument data is transmitted to the respective system for storage in an associated data store.

FIG. 6 is a block diagram of one embodiment of a mobile device 600. The mobile device 600 provides additional details for the mobile devices discussed herein.

In one embodiment, the mobile device 600 is a system, which may include a contactless reader, such as NFC device 602, one or more processors 604, a memory 606, a network interface 608. Mobile device 600 may also include a number of processing modules, which may be implemented as hardware, software, firmware, or a combination. Mobile device 600 may further include an input/output (I/O) controller for controlling devices enabling a user to interact with mobile device 600, such as one or more I/O controllers associated with a keyboard, touch-screen, buttons, or similar user input and/or output devices of the mobile device 600. It should be appreciated that mobile device 600 may also include, although not illustrated, a user interface a power device (e.g., a battery), as well as other components typically associated with electronic devices. Network interface 608 of mobile device 600 may also be coupled to a number of wireless subsystems (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems).

The memory 606 may be coupled to processor(s) 604 to store instructions for execution by processor(s) 604. In some embodiments, the memory is non-transitory. It should be appreciated that embodiments as described herein may be implemented through the execution of instructions, for example as stored in the memory 606 or other element, by processor(s) 604 of the mobile device 600 and/or other circuitry of the mobile device 600. Particularly, circuitry of the mobile device 600, including but not limited to processor and reader, may operate under the control of a program, routine, or the execution of instructions to execute methods or processes in accordance with the embodiments described herein. For example, such a program may be implemented in firmware and/or software (e.g. stored in memory and/or other locations) and may be implemented by processors, such as processor and a contactless reader, and/or other circuitry of the reader devices. Further, it should be appreciated that the terms processor, microprocessor, circuitry, controller, etc., may refer to any type of logic or circuitry capable of executing logic, commands, instructions, software, firmware, functionality and the like.

FIG. 7 is one embodiment of a computer system that may be used to support the systems and operations discussed herein. It will be apparent to those of ordinary skill in the art, however that other alternative systems of various system architectures may also be used.

The data processing system illustrated in FIG. 7 includes a bus or other internal communication means 717 for communicating information, and one or more processor(s) 710 coupled to the bus 715 for processing information. The system further comprises a random access memory (RAM) or other volatile storage device 750 (referred to as memory), coupled to bus 715 for storing information and instructions to be executed by processor(s) 710. Main memory 750 also may be used for storing temporary variables or other intermediate information during execution of instructions by processor(s) 710. The system also comprises a read only memory (ROM) and/or static storage device 720 coupled to bus 715 for storing static information and instructions for processor(s) 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor(s) 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A system for authentication of a user, comprising:
- a near field communications (NFC) device;
- a memory; and
- a processor coupled with the memory and the NFC device, the processor configured to:
  - detect a trigger event corresponding to an application executed by the processor, wherein the trigger event is associated with a fraud or implicating an expose or use of sensitive user information of the user;
  - subsequent to detecting the trigger event, initiate an authentication process to authenticate the user;
  - subsequent to initiating the authentication process, prompt the user, via a first user interface of the application, to provide payment instrument information via the NFC device using a first physical payment card, wherein the first physical payment card comprises an integrated circuit and the NFC device establishes a wireless communication link with the first physical payment card to collect the payment instrument information from the integrated circuit;
  - determine that the payment instrument information functions as an authentication instrument for the user;
  - subsequent to determining that the payment instrument information functions as the authentication instrument for the user, compare the payment instrument information and stored payment instrument data, wherein the stored payment instrument data is collected via the NFC device from the first physical payment card during an onboarding process of the user onto a user account;
  - authenticate the user by determining that the payment instrument information matches the stored payment instrument data; and
  - subsequent to authenticating the user, process a transaction using payment instrument data from a second physical payment card that is different from that of the first physical payment card, the second physical payment card configured to process a financial component of the transaction requested to be processed by the application,
  - wherein the onboarding process comprises generating a second user interface that prompts the user to tap the first physical payment card for collection of the stored payment instrument data;
  - wherein the application is a merchant application that comprises one or more software development kits (SDKs) of a payment platform that provides one or more payment processing services to the application during execution of the application, wherein the one or more SDKs facilitate the NFC device to collect the payment instrument information from the first physical payment card;
  - wherein the first physical payment card is an EMV-compliant smart card.

2. The system of claim 1, wherein the application is associated with a merchant and the system comprises a mobile device of the user or a mobile device associated with the merchant.

3. The system of claim 1, wherein the trigger event comprises at least one of a user login to the application, an amount of the transaction requested to be processed by the application, a detected location change associated with the user, and a detected account change associated with a merchant account of the user.

4. The system of claim 1, wherein the application is a transaction processing application.

5. The system of claim 1, wherein, prior to collection of the payment instrument data, the one or more SDKs perform an attestation that a mobile device executing the application has not been tampered with.

6. The system of claim 5, wherein the attestation comprises verifying that an operating system of the mobile device has not been tampered with and verifying that the mobile device is free from boot loader tampering.

7. A system for authentication of a user during a transaction, comprising:
- a near field communications (NFC) device;
- a memory; and
- a processor coupled with the memory and the NFC device, the processor configured to:
  - detect a request of an application to process the transaction for the user;
  - subsequent to detecting the request, initiate an authentication process to authenticate the user;
  - subsequent to initiating the authentication process, activate the NFC device and receive card data collected by the NFC device from a first physical payment card, the card data purported to be associated with the user, wherein the first physical payment card comprises an integrated circuit and the NFC device establishes a wireless communication link with the first physical payment card to collect the card data from the integrated circuit;

subsequent to receiving the card data purported to be associated with the user, compare the card data purported to be associated with the user and card data known to be associated with the user, wherein the card data known to be associated with the user is collected by the NFC device from the first physical payment card during an onboarding process of the user onto a user account;

authenticate the user by determining that the card data purported to be associated with the user matches card data known to be associated with the user; and subsequent to authenticating the user, cause the application to process the transaction using payment instrument data from a second physical payment card that is different from that of the first physical payment card, the second physical payment card configured to process a financial component of the transaction requested to be processed by the application, wherein the onboarding process comprises generating a user interface that prompts the user to tap the first physical payment card for collection of the card data known to be associated with the user;

wherein the application is a merchant application that comprises one or more software development kits (SDKs) of a payment platform that provides one or more payment processing services to the application during execution of the application, wherein the one or more SDKs facilitate the NFC device to collect the card data purported to be associated with the user from the first physical payment card;

wherein the first physical payment card is an EMV-compliant smart card.

8. The system of claim 7, wherein the processor is further configured to cause the application to process the financial component of the transaction using the second physical payment card.

9. The system of claim 7, wherein the processor is configured to, prior to receipt of the card data, generate a first user interface that prompts the user to bring the first physical payment card to a read proximity of the NFC device.

10. The system of claim 7, wherein the processor is further configured to:

detect a trigger event corresponding to the application, the transaction, or a combination thereof; and subsequent to detecting the trigger event, initiate the authentication process to authenticate the user;

wherein the trigger event comprises at least one of a user login to the application, an amount of the transaction, a detected location change associated with the user, and a detected account change associated with a merchant account of the user.

11. The system of claim 7, wherein the onboarding process of the user onto the user account provides access to services of a merchant system associated with the application.

12. The system of claim 11, wherein the processor is further configured to:

cause the application to execute the onboarding process;

collect a first subset of user data for use by the application;

cause the application to generate a second user interface that prompts the user to tap the first physical payment card for collection of a second subset of user data;

receive the second subset of user data via the NFC device, the second subset of user data comprising the card data known to be associated with the user; and cause storage of the first and second subsets of user data in a user account data store.

13. The system of claim 7, wherein, prior to collection of the card data known to be associated with the user, the one or more SDKs perform an attestation that a mobile device executing the application has not been tampered with.

14. The system of claim 13, wherein the attestation comprises verifying that an operating system of the mobile device has not been tampered with and verifying that the mobile device is free from boot loader tampering.

15. A method for authentication of a user during a transaction, comprising:

detecting, by a processor of a system, a request of an application to process the transaction for the user;

subsequent to detecting the request, initiating, by the processor, an authentication process to authenticate the user;

subsequent to initiating the authentication process, receiving, by the processor, card data collected by a near field communications (NFC) device of the system, the card data collected from a first physical payment card and purported to be associated with the user, wherein the first physical payment card comprises an integrated circuit and the NFC device establishes a wireless communication link with the first physical payment card to collect the card data from the integrated circuit;

comparing the card data purported to be associated with the user and card data known to be associated with the user, wherein the card data known to be associated with the user is collected by the NFC device from the first physical payment card during an onboarding process of the user onto a user account;

authenticating the user by determining, by the processor, that the card data purported to be associated with the user matches card data known to be associated with the user; and subsequent to authenticating the user, causing the application to process the transaction using payment instrument data from a second physical payment card that is different from the first physical payment card, the second physical payment card configured to process a financial component of the transaction requested to be processed by the application, wherein the onboarding process comprises generating a user interface that prompts the user to tap the first physical payment card for collection of the card data known to be associated with the user;

wherein the application is a merchant application that comprises one or more software development kits (SDKs) of a payment platform that provides one or more payment processing services to the application during execution of the application, wherein the one or more SDKs facilitate the NFC device to collect the card data purported to be associated with the user from the first physical payment card;

wherein the first physical payment card is an EMV-compliant smart card.

16. The method of claim 15, wherein the application processes a financial component of the transaction using the second physical payment card.

17. The method of claim 15, further comprising:

detecting a trigger event corresponding to the application, the transaction, or a combination thereof; and subsequent to detecting the trigger event, initiating the authentication process to authenticate the user;

wherein the trigger event comprises at least one of a user login to the application, an amount of the transaction, a detected location change associated with the user, and a detected account change associated with a merchant account of the user.

18. The method of claim 15, wherein the onboarding process of the user onto the user account provides access to services of a merchant system associated with the application.

19. The method of claim 15, further comprising:

prior to receipt of the card data, generating a user interface that prompts the user to bring the first physical payment card to a read proximity of the NFC device.

20. The method of claim 15, wherein, prior to collection of the card data known to be associated with the user, the one or more SDKs perform an attestation that a mobile device executing the application has not been tampered with.

* * * * *